United States Patent [19]
Bannai

[11] Patent Number: 5,974,559
[45] Date of Patent: Oct. 26, 1999

[54] INFORMATION PROCESSING APPARATUS, METHOD FOR MANAGING STATUS THEREOF AND MEMORY MEDIUM

[75] Inventor: Nobuyuki Bannai, Hasuda, Japan

[73] Assignee: Canon Kabushiki Kaisha, Tokyo, Japan

[21] Appl. No.: 09/024,159

[22] Filed: Feb. 17, 1998

[30] Foreign Application Priority Data

| Feb. 17, 1997 | [JP] | Japan | ................................. 9-046932 |
| Feb. 3, 1998 | [JP] | Japan | ............................... 10-021915 |

[51] Int. Cl.⁶ .............................. G06F 1/26; G06F 1/32
[52] U.S. Cl. ........................ 713/330; 713/320; 713/321
[58] Field of Search .................................. 713/321, 320, 713/323, 300, 324, 330, 310; 365/227; 711/100

[56] References Cited

U.S. PATENT DOCUMENTS

| 5,637,932 | 6/1997 | Koreeda et al. ....................... 307/125 |
| 5,737,616 | 4/1998 | Watanabe ............................... 713/340 |
| 5,875,120 | 2/1999 | Matsushima et al. .................. 713/321 |
| 5,875,348 | 2/1999 | Matsushima et al. ..................... 710/4 |
| 5,900,026 | 5/1999 | Ryu ....................................... 713/320 |

*Primary Examiner*—Gopal C. Ray
*Attorney, Agent, or Firm*—Fitzpatrick, Cella, Harper & Scinto

[57] ABSTRACT

There are provided an information processing apparatus, a status managing method therefor and a memory medium therefor, in which the power saving status or the active status of a host equipment is detected by an algorithm of a program stored in a hard disk, then the shift of the host equipment to the power saving status or the return thereof to the active status is informed by the algorithm of the program stored in the hard disk, and a peripheral equipment in response shifts to a status same as that of the host equipment. Consequently the status of the peripheral equipment can be matched with that of the host equipment, without a timer function for measuring the time for shifting to the power saving status or unit for detecting a returning event to the active status in the peripheral equipment.

20 Claims, 7 Drawing Sheets

INFORMATION PROCESSING APPARATUS, METHOD FOR MANAGING STATUS THEREOF AND MEMORY MEDIUM

BACKGROUND OF THE INVENTION

1. Field of the Invention

The present invention relates to an information processing apparatus, a method for managing the status thereof and a memory medium, and more particularly to an information processing apparatus consisting of a host equipment having a power saving state and a peripheral equipment, a method for managing the status thereof and a memory medium.

2. Related Background Art

In a peripheral equipment provided with a function of shifting to a power saving state (for example standby function), there has conventionally adopted a process of shifting to a power saving status if an activating event (such as the depression of a switch or the data transfer from a host equipment) for such peripheral equipment does not occur within a time determined in advance in the peripheral equipment itself, and returning to an active status if such activating event occurs.

Also in a peripheral equipment provided with a function of shifting to a power saving status (such as stand-by function) and connected to a host equipment provided with a function of shifting to a power saving status (such as screen saver function for the display), there has been adopted a process of shifting to the power saving status when a time determined in advance in the peripheral equipment itself expires and returning to an active status in case a returning event to the active status (for example the depression of a switch or the data transfer from the host equipment) occurs in the peripheral equipment.

However, such conventional processes have been associated with drawbacks that a timer function has to be provided in the peripheral equipment and that there may result an unsynchronized state in which the host equipment is in the power saving status while the peripheral equipment is in the active status or the host equipment is in the active status while the peripheral equipment is in the power saving status, if the time for shifting to the power saving status is different between the host equipment and the peripheral equipment.

SUMMARY OF THE INVENTION

An object of the present invention is to provide an information processing apparatus capable of shifting to the power saving status without providing the peripheral equipment with the timer function, a status managing method therefor and a memory medium therefor.

Another object of the present invention is to provide an information processing apparatus capable of shifting the status of the peripheral equipment, matching the status of the host equipment, a status managing method therefor and a memory medium therefor.

The above-mentioned objects can be attained, according to the present invention, by an information processing apparatus consisting of a host equipment having a first operation mode and a second operation mode, and a peripheral equipment having a third operation mode and a fourth operation mode, the apparatus comprising host status detecting means for detecting whether the host equipment is in the first or second operation mode, peripheral status detecting means for detecting whether the peripheral equipment is in the third or fourth operation mode, shift instruction means for instructing a shift to the peripheral equipment from the third operation mode to the fourth operation mode in case the operation mode of the host equipment detected by the host status detecting means is the first operation mode and the operation mode of the peripheral equipment detected by the peripheral status detecting mode is the third operation mode, and mode shifting means for shifting the peripheral equipment from the third operation mode to the fourth operation mode in response to the instruction from the shift instructing means.

Also according to the present invention there is provided an information processing apparatus consisting of a host equipment having a first operation mode and a second operation mode, and a peripheral equipment having a third operation mode and a fourth operation mode, the apparatus comprising host status detecting means for detecting a shift of the host equipment from the second operation mode to the first operation mode, peripheral status detecting means for detecting whether the peripheral equipment is in the third or fourth operation mode, shift instruction means for instructing a shift to the peripheral equipment from the third operation mode to the fourth operation mode in case the host status detecting means detects the shift of the operation status and the operation mode of the peripheral equipment detected by the peripheral status detecting mode is the third operation mode, and mode shifting means for shifting the peripheral equipment from the third operation mode to the fourth operation mode in response to the instruction from the shift instructing means.

Also according to the present invention, there is provided an information processing apparatus to be connected to a peripheral equipment having a first operation mode and a second operation mode, the apparatus comprising operation mode selecting means for determining whether to operate the information processing apparatus in a third operation mode or in a fourth operation mode, host status detecting means for detecting whether the current operation mode is the third or fourth operation mode, peripheral status detecting means for detecting whether the peripheral equipment is in the first or second operation mode, and shift instruction means for instructing a shift to the peripheral equipment from the first operation mode to the second operation mode in case the operation mode of the host equipment detected by the host status detecting means is the third operation mode and the operation mode of the peripheral equipment detected by the peripheral status detecting mode is the first operation mode.

Also according to the present invention, there is provided an information processing apparatus to be connected to a peripheral equipment having a first operation mode and a second operation mode, the apparatus comprising operation mode selecting means for determining whether to operate the information processing apparatus in a third operation mode or in a fourth operation mode, host status detecting means for detecting a shift of the operation mode from the third operation mode to the fourth operation mode, peripheral status detecting means for detecting whether the peripheral equipment is in the first or second operation mode, and shift instruction means for instructing a shift to the peripheral equipment from the first operation mode to the second operation mode in case the shift of the operation mode is detected by the host status detecting means and the operation mode of the peripheral equipment detected by the peripheral status detecting mode is the first operation mode.

Also according to the present invention, there is provided a status managing method for an information processing apparatus consisting of a host equipment having a first operation mode and a second operation mode, and a peripheral equipment having a third operation mode and a fourth operation mode, the method comprising a host status detecting step of detecting whether the host equipment is in the first or second operation mode, a peripheral status detecting step of detecting whether the peripheral equipment is in the third or fourth operation mode, a shift instructing step of instructing a shift to the peripheral equipment from the third operation mode to the fourth operation mode in case the operation mode of the host equipment detected by the host status detecting step is the first operation mode and the operation mode of the peripheral equipment detected by the peripheral status detecting step is the third operation mode, and a mode shifting step of shifting the peripheral equipment from the third operation mode to the fourth operation mode in response to the instruction of the shift instructing step.

Also according to the present invention there is provided a status managing method for an information processing apparatus consisting of a host equipment having a first operation mode and a second operation mode, and a peripheral equipment having a third operation mode and a fourth operation mode, the method comprising a host status detecting step of detecting a shift of the host equipment from the second operation mode to the first operation mode, a peripheral status detecting step of detecting whether the peripheral equipment is in the third or fourth operation mode, a shift instructing step of instructing a shift to the peripheral equipment from the third operation mode to the fourth operation mode in case the host status detecting step detects the shift of the operation status and the operation mode of the peripheral equipment detected by the peripheral status detecting step is the third operation mode, and a shifting step of shifting the peripheral equipment from the third operation mode to the fourth operation mode in response to the instruction of the shift instructing step.

Also according to the present invention, there is provided a memory medium storing a control program for controlling an information processing apparatus having a third operation mode and a fourth operation mode and connected to a peripheral equipment having a first operation mode and a second operation mode, the control program comprising a host status detecting module of detecting whether the host equipment is in the third or fourth operation mode, a peripheral status detecting module of detecting whether the peripheral equipment is in the first or second operation mode, and a shift instructing module of instructing a shift to the peripheral equipment from the first operation mode to the second mode in case the operation mode of the host equipment detected by the host status detecting module is the third operation mode and the operation mode of the peripheral equipment detected by the peripheral status detecting module is the first operation mode.

Also according to the present invention there is provided a memory medium storing a control program for controlling an information processing apparatus having a third operation mode and a fourth operation mode and connected to a peripheral equipment having a first operation mode and a second operation mode, the control program comprising a host status detecting module of detecting a shift of the host equipment from the third operation mode to the fourth operation mode, a peripheral status detecting module of detecting whether the peripheral equipment is in the first or second operation mode, and a shift instructing module of instructing a shift to the peripheral equipment from the first operation mode to the second operation mode in case the host status detecting module detects a shift of the operation status and the operation mode of the peripheral equipment detected by the peripheral status detecting module is the third operation mode.

DESCRIPTION OF THE PREFERRED EMBODIMENTS

Now the present invention will be clarified in detail by preferred embodiments thereof, with reference to the attached drawings.

First Embodiment

Figure 1:
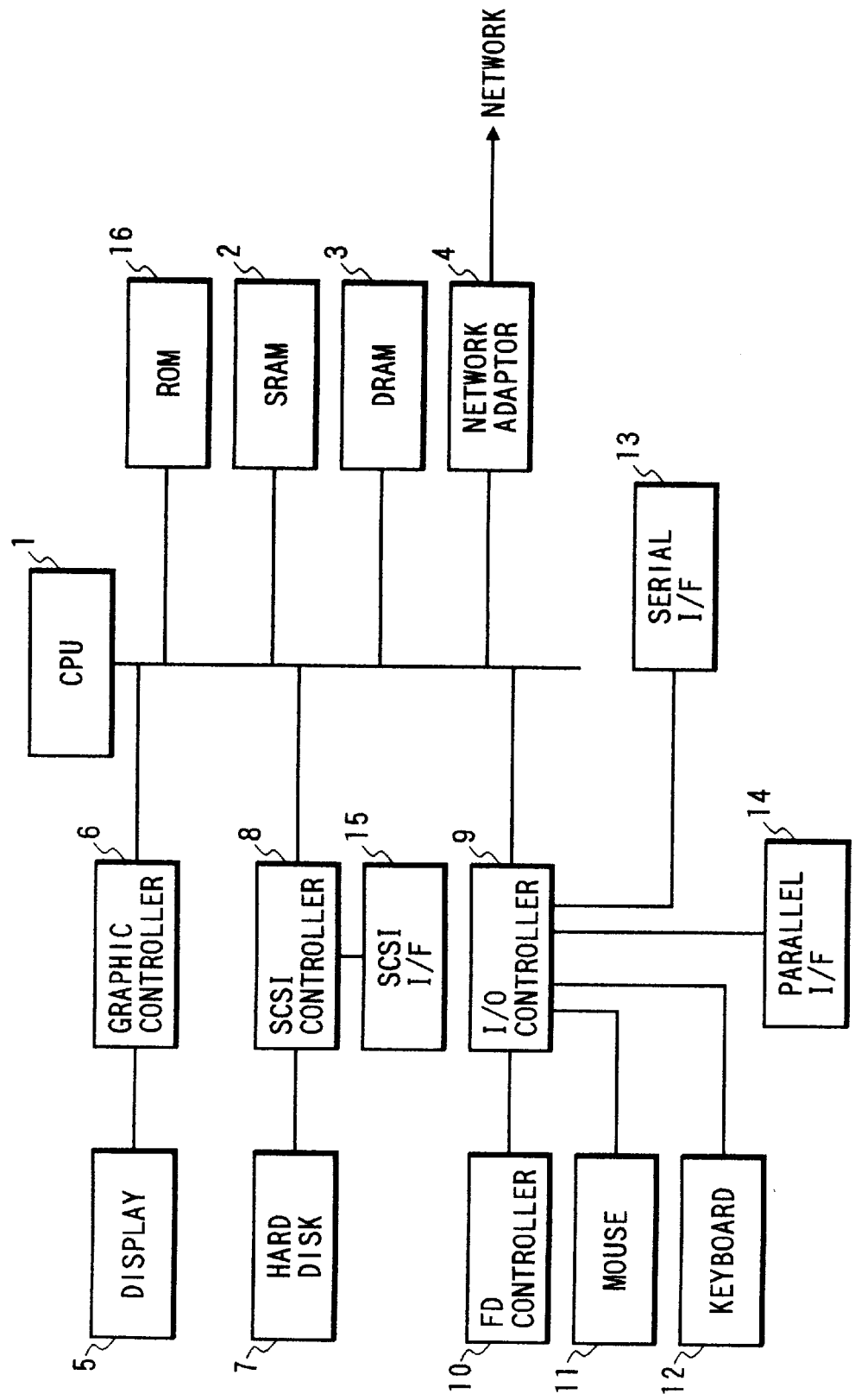
FIG. 1 is a block diagram showing a host equipment constituting an embodiment of the present invention.

FIG. 1 is a block diagram showing the configuration of a host equipment constituting an embodiment of the present invention.

Referring to FIG. 1, a CPU (central processing unit) 1 controls the entire host equipment. A ROM 16 stores, in the present embodiment, the Microsoft Windows of Microsoft Inc. as the OS (operating system; hereinafter simply called OS), and the CPU 1 controls the entire host equipment by executing the OS stored in the ROM 16. An SRAM 2 is principally used as a cache memory. A DRAM 3 is used as a main memory for storing various data and programs, and is also used for storing the control sequence for realizing the present embodiment.

The CPU 1 monitors the mouse and the keyboard by executing the OS stored in the ROM 16, and, if these components are not manipulated for a predetermined time, activates an application called screen saver, for preventing the damage to the display screen or for hiding the information displayed thereof. The screen saver application not only erases the information displayed on the display screen but also displays a moving image thereon, in order to inform the operator that the host equipment is in operation. The status after the activation of the screen saver application is called a power saving status of the host equipment. Also the status in which the screen saver application is not activated or has been terminated is called an active state of the host equipment.

A network adapter 4 is connected to an external network for enabling data exchange with an external information processing apparatus. A display 5, for displaying various information for the operator, is connected to the CPU 1 through a graphic controller to be explained later. A graphic controller 6 controls the display 5 for displaying image information etc.

A hard disk 7, constituting one of the memory devices for storing application programs etc., is connected to the CPU 1 through a SCSI controller to be explained later. A SCSI (small computer system interface) controller 8 controls equipment of SCSI standards.

An input-output (I/O) controller 9 controls various input and output devices, and a floppy disk controller, a mouse, a keyboard, a serial interface and a parallel interface, to be explained later, are connected to the CPU 1 through the I/O controller 9.

A floppy disk controller 10 controls the data write-in into and read-out from a floppy disk constituting an external memory device. A mouse 11 and a keyboard 12 are used by the operator for various input operations.

A serial interface 13 is used for connection with an external peripheral equipment, with serial format data. A parallel interface 14 is used for connection with an external peripheral equipment, with parallel format data. A SCSI interface 15 is used for connection with an external peripheral equipment, with SCSI format data.

Figure 2:
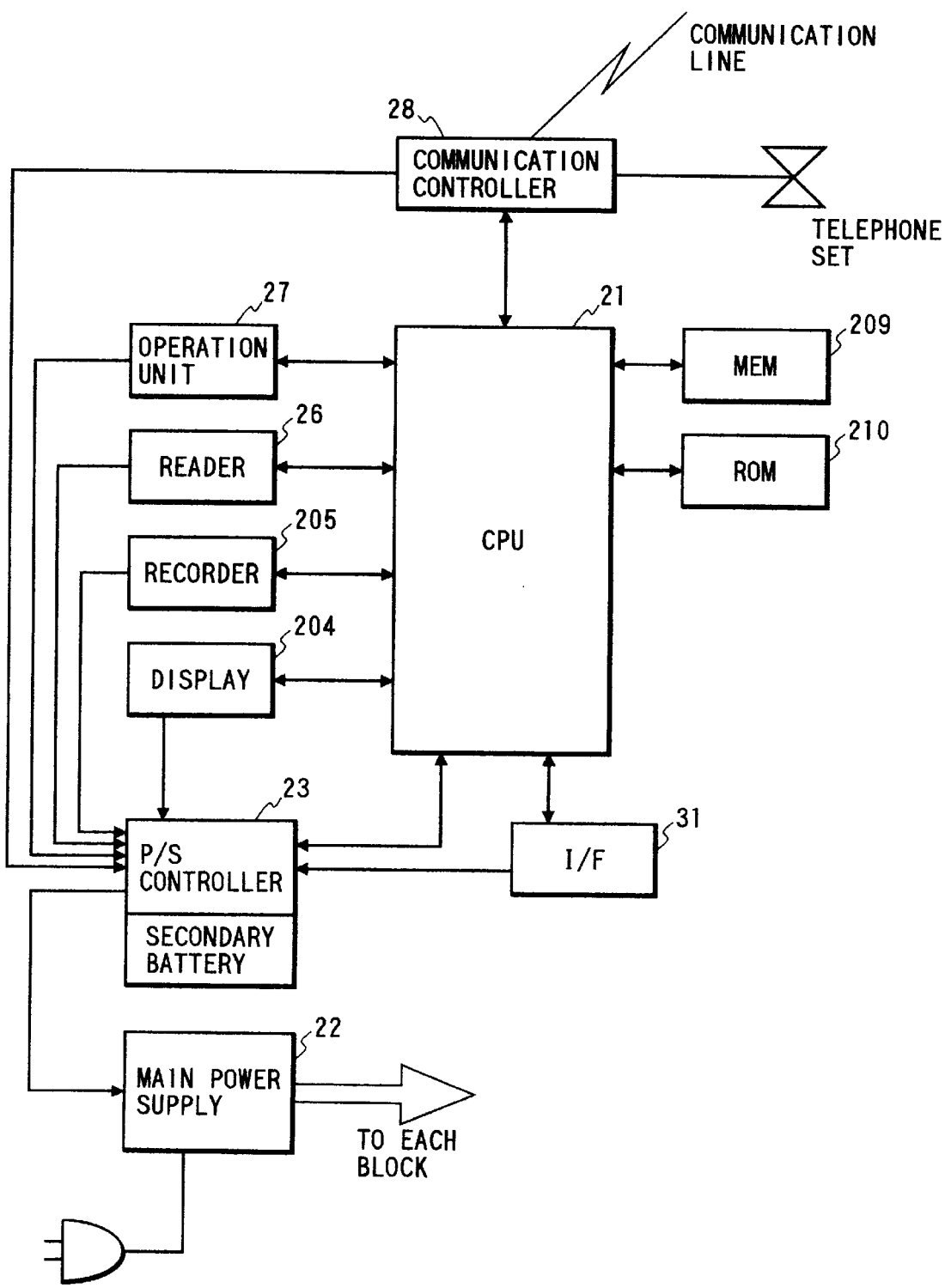
FIG. 2 is a block diagram showing a facsimile apparatus as the peripheral equipment constituting an embodiment of the present invention.

FIG. 2 is a block diagram showing the configuration of a facsimile apparatus constituting the peripheral equipment in an embodiment of the present invention.

Referring to FIG. 2, a system control unit (CPU) 21 controls the entire apparatus according to a sequence stored in a ROM to be explained later.

A main power supply unit 22 supplies the entire apparatus with electric power, based on an externally supplied AC power or on a battery. A power supply control unit 23 controls the main power supply unit 22 for the power supply of the entire apparatus. It is operated with an incorporated sub power supply (secondary battery) in the power saving status (when the main power supply is off), and, when an activating event for the main power supply occurs, turns on the main power supply unit to supply the various blocks of the apparatus with the electric power, thereby shifting to the active status. The activating event of the main power supply includes, for example, the transmission of output data from the host equipment to the present apparatus through an I/F 31, a facsimile transmission from a communication line through a communication control unit 28, an operation on an operation unit 27 by the operator, and the setting of an original on a reader unit 26.

There are also provided a display unit 204 for displaying, for example, the status of the present apparatus; a recorder unit 205 for outputting, for example, the image data received from the outside; a reader unit 26 for reading an original; and an operation unit 27 to be manipulated by the operator for entering instructions to the present apparatus.

A communication control unit 28 controls the data transfer to a communication line composed of a public communication network and the data reception therefrom. A MEM 209 stores the image data such as received or read data and the management data, and is backed up by the secondary battery in the power saving status.

A ROM 210 stores control programs, such as the control sequence to be explained later, for controlling the present apparatus. An interface (I/F) unit 31 is connected, in the present embodiment, with the parallel interface 14 of the host equipment for data exchange.

In the facsimile apparatus of the present embodiment, the power saving status means a state in which the main power supply unit 22 is turned off and the CPU 21, the reader unit 26, the operation unit 27, the communication control unit 28 and the I/F unit 31 are powered from the secondary battery of the power supply control unit 23. Also the active state means a state in which the main power supply unit 22 is turned on to send electric power to various blocks of the apparatus.

In the present facsimile apparatus, even when the screen saver is activated on the host equipment and a shift informing command to the power saving status is received from the host equipment, such command is disregarded and the facsimile apparatus does not shift to the power saving status in case of presence of an activating event such as a receiving process, a printing process, a reading process or a setting registration process in execution or an original set on the reader unit 26.

Also in case the host equipment and the facsimile apparatus are both in the power saving status and if there occurs an activating event for the facsimile apparatus such as setting of an original on the reader unit, reception of external data or execution of a setting registration process, the facsimile apparatus returns to the original power saving status after the process of such event is terminated.

In the following there will be explained the control sequence of the present embodiment.

Figure 3:
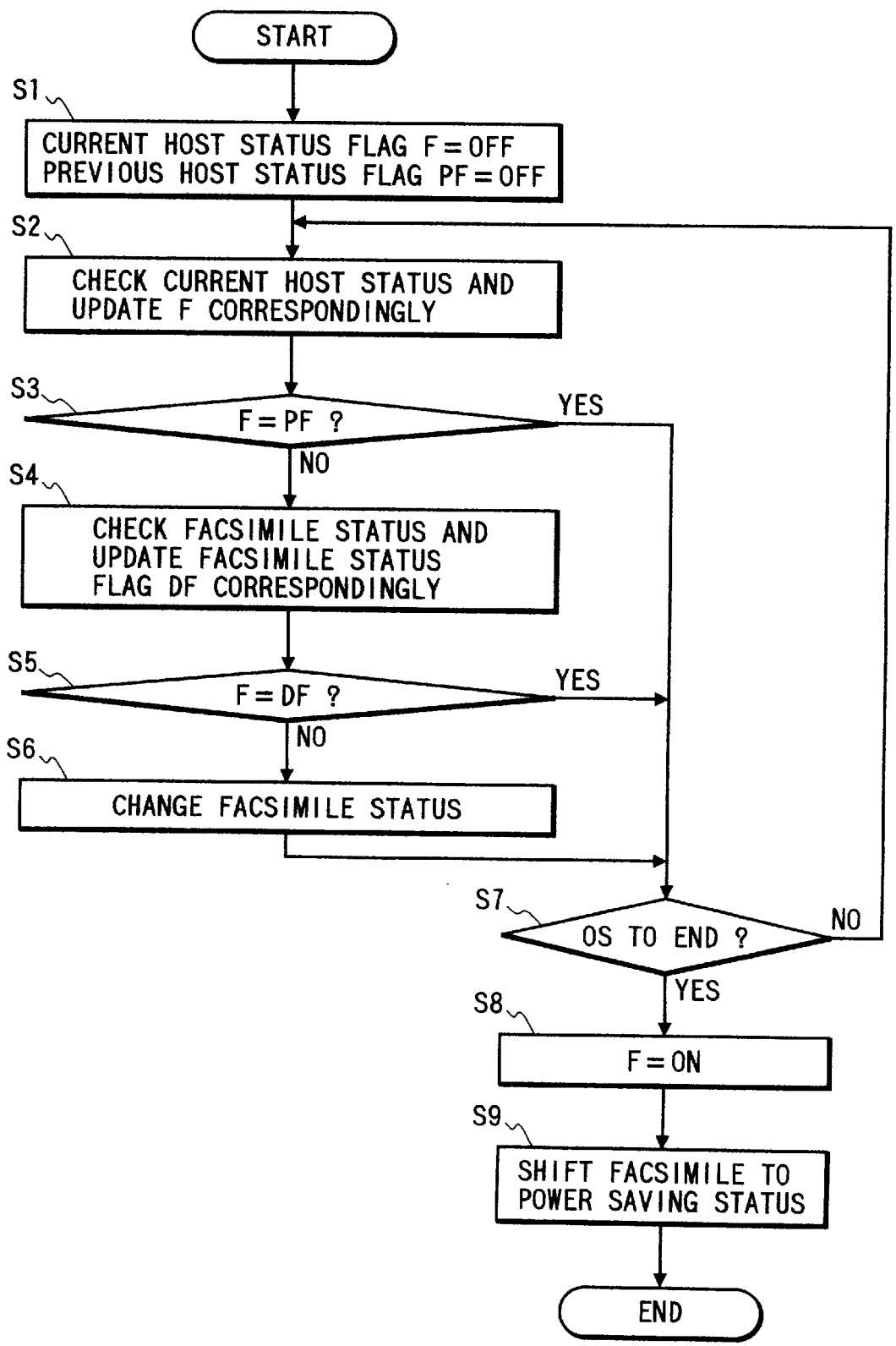
FIG. 3 is a flow chart showing a shifting sequence to the power saving status in the above-mentioned embodiment.

FIG. 3 is a flow chart showing the entire sequence of shifting to the power saving status in the present embodiment.

At first there are prepared, on the SRAM 2, a flag F indicating the current status of the host equipment and a flag PF indicating the preceding status thereof, and these flags are turned off (step S1). Each flag indicates the power saving status in the ON state and the active state in the OFF state.

Then a host status detecting function is activated to investigate the current status of the host equipment, thereby determining the status of thereof, and the flag F is varied according to the determined status (step S2). Then the flag F is compared with the flag PF to discriminate if the status of the host equipment has been shifted (step S3).

In case of a shift in the status of the host equipment, a device status detecting function is activated to investigate the status of the facsimile apparatus connected to the host equipment (step S4). The device status detecting function varies a flag DF, provided on the SRAM 2 for discriminating the status of the facsimile apparatus, according to the status of the facsimile apparatus. The flag DF indicates, in the ON state, the power saving status of the facsimile apparatus and the active status thereof in the OFF state.

Then flag F is compared with the flag DF to discriminate whether the host equipment and the facsimile apparatus are synchronized (step S5). If not synchronized, a status shift informing function is activated to send a status shift informing command to the facsimile apparatus, thereby shifting the status thereof (step S6). If the facsimile apparatus is in the course of execution of any process (such as in the course of aforementioned data reception), the facsimile apparatus disregards the status shift informing command and continues the process in progress.

Then there is checked whether the OS is to be terminated (step S7). Also there is similarly checked whether the OS is to be terminated in case the step S3 identifies that the status of the host equipment has not shifted, or in case the step S5 identifies that the status of the host equipment is synchronized with that of the facsimile apparatus.

If the OS is to be terminated, in preparation for the turning-off of the power supply in the host equipment, the flag F is turned on to activate the status shift informing function thereby shifting the facsimile apparatus to the power saving status prior to the termination of the OS (step S9).

In case the step S7 identifies that the OS is not to be terminated, the above-explained sequence is repeated, at a predetermined interval, from the step S2 of activating the host status detecting function.

Figure 4:
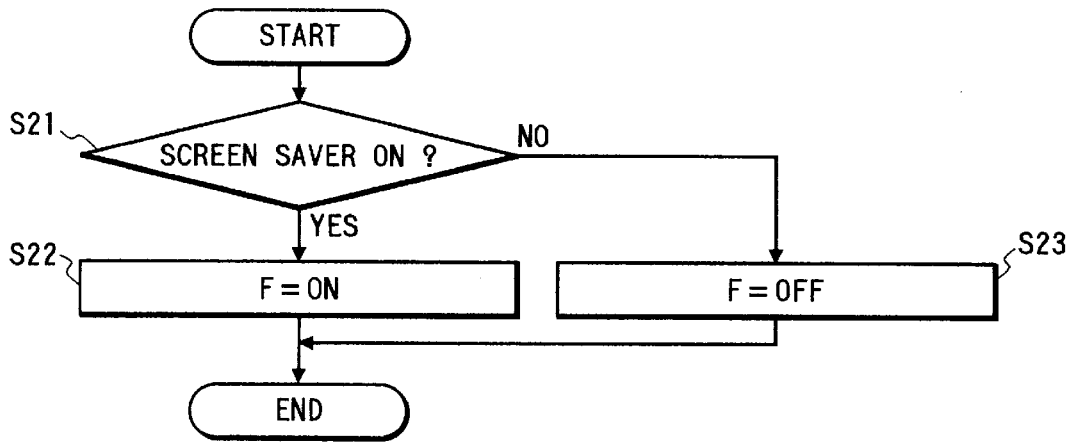
FIG. 4 is a flow chart showing a host status detecting function in the above-mentioned embodiment.

FIG. 4 is a flow chart showing the sequence of the host status detecting function in the step S2 in FIG. 3.

Since the application currently functioning on the host equipment can be known from the OS, whether the host equipment is in the power saving status or in the active status is discriminated by whether the screen saver application is activated in the host equipment (step S21). The flag F is turned on in case the screen saver application is activated (step S22), but it is turned off in case the screen saver application is not activated (step S23), and the sequence is then terminated.

Figure 5:
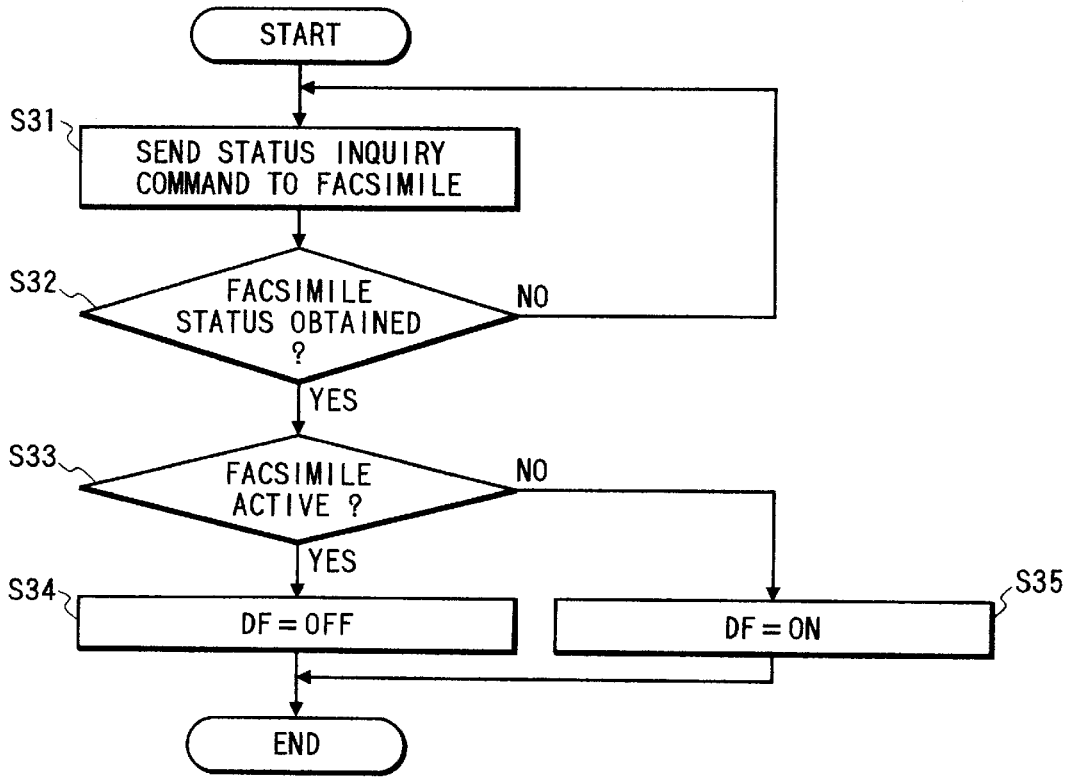
FIG. 5 is a flow chart showing a device status detecting function in the above-mentioned embodiment.

FIG. 5 is a flow chart showing the sequence of the device status detecting function in the step S4 in FIG. 3.

The facsimile apparatus informs the current status thereof to the host equipment by exchange of predetermined device detection commands, between the device status detecting function on the host equipment and the facsimile apparatus connected thereto.

At first the host equipment transmits, to the facsimile apparatus, a status acquiring command requesting the acquisition of the current status of the facsimile apparatus (step S31). In response the facsimile apparatus prepares data for informing the current status.

Then, in a step S32, the host equipment discriminates whether there have been acquired data indicating the status from the facsimile apparatus, and, if not acquired, it repeats the transmission of the status acquiring command until the data acquisition is made.

If the data indicating the status of the facsimile apparatus have been acquired, the current status of the facsimile apparatus is investigated from the acquired data (step S33), and the flag DF is turned off in case of the active status (step S34) or the flag DF is turned on in case of the power saving status (step S35).

Figure 6:
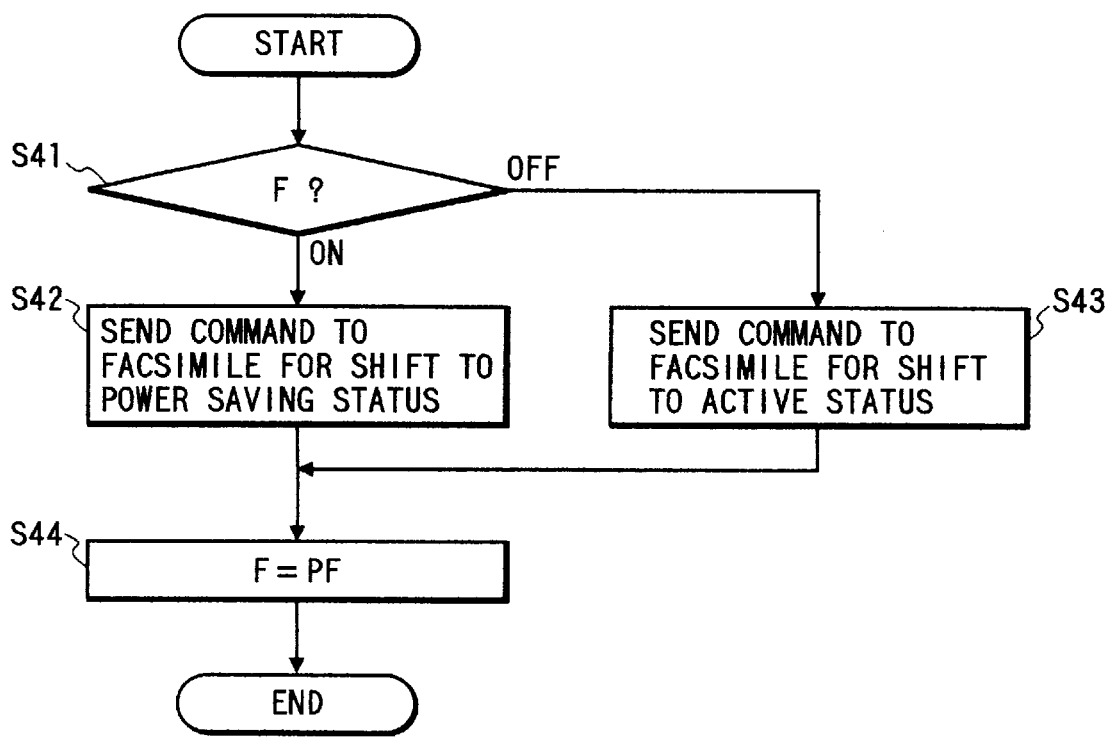
FIG. 6 is a flow chart showing a status shift informing function in the above-mentioned embodiment.

FIG. 6 is a flow chart showing the sequence of the status shift informing function in the step S6 in FIG. 3.

At first, in order to discriminate the status of the host equipment, the flag F is checked (step S41). If it is on, a command for status shift to the power saving status is transmitted to the facsimile apparatus (step S42), but, if it is off, a command for status shift to the active state is transmitted (step S43).

Then the flag PF, the indicating the preceding status of the host equipment, is made same as the flag F (step S44) and the sequence is terminated.

Figure 7:
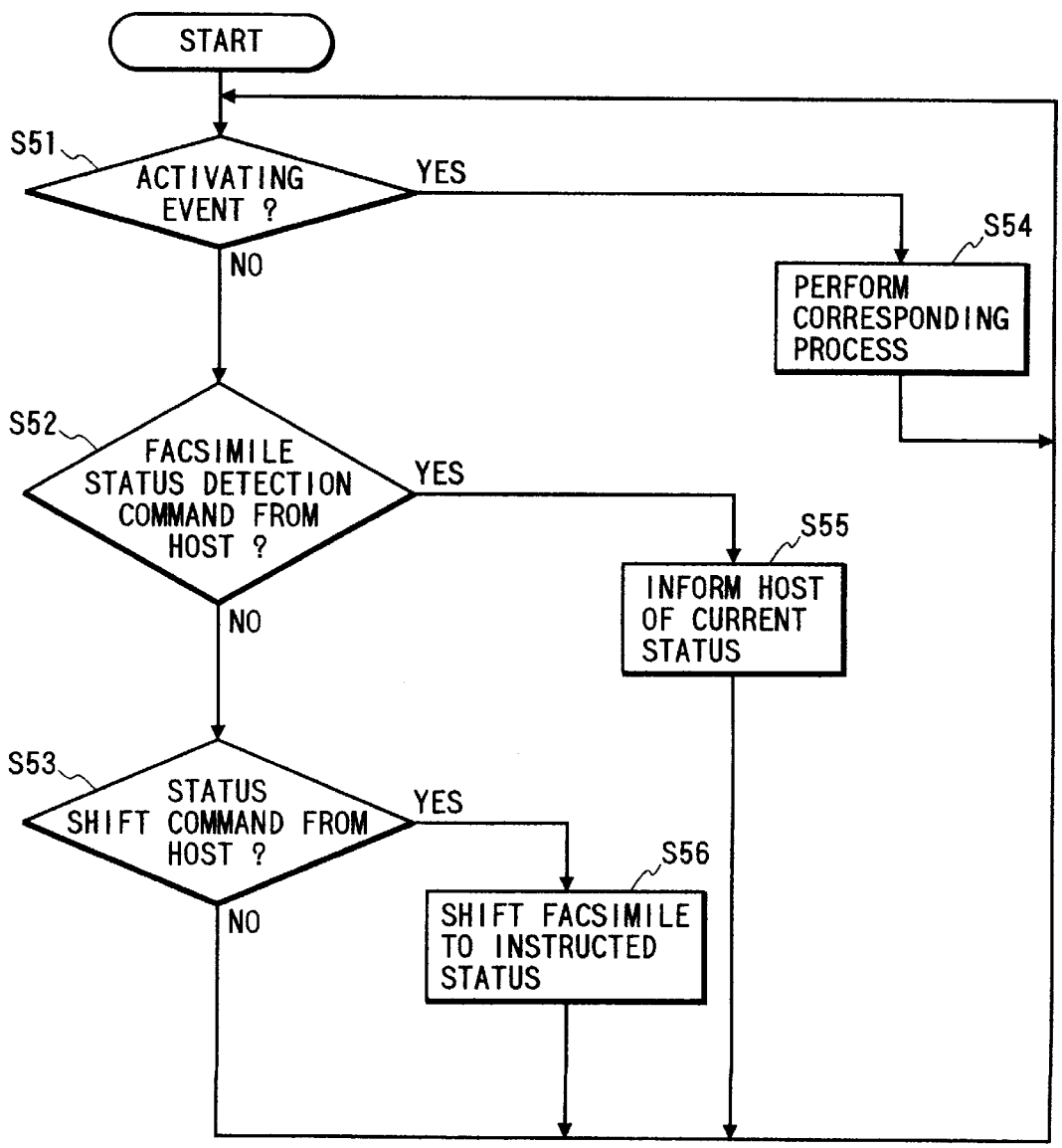
FIG. 7 is a flow chart showing a schematic control sequence in a peripheral equipment.

FIG. 7 is a flow chart schematically showing the control sequence in the peripheral equipment.

At first there are discriminated whether an activating event has occurred (step S51), whether a device status detecting command has been transmitted from the host equipment (step S52) and whether a status shift command has been transmitted from the host equipment (step S53).

If the step S51 identifies that an activating event has occurred, there is executed a process corresponding to such activating event (step S54). If a status shift command is transmitted from the host equipment in the course of execution of such process corresponding to the activating event, such command is disregarded and the peripheral equipment returns, after the execution of such process, to the state prior to the occurrence of the activating event, as explained in the foregoing.

In case the step S52 identifies that the device status detecting command has been transmitted, the current status is transmitted to the host equipment (step S55). In case the step S53 identifies that the status shift command has been transmitted, the status is shifted to the designated status (step S56).

The functions explained in the foregoing enable to synchronize the status shift in the host equipment with that in the facsimile apparatus, whereby the shift to the power saving status can be realized without providing the facsimile apparatus with a timer function for the shift to the power saving status.

Second Embodiment

The system configuration of the second embodiment is same as that in the first embodiment. In the first embodiment, when the host equipment is shifted from the power saving status to the active status, the status shift command to the active status is transmitted by the status informing function to the facsimile apparatus connected to the host equipment even if the activating event is absent in the facsimile apparatus. Consequently the facsimile apparatus is shifted to the active status even if it need not be activated, thus resulting in an increased power consumption.

In the present embodiment, therefore, in order to reduce the power consumption, the status shift command is not transmitted even when the host equipment is shifted to the active state, if the activating event is absent in the facsimile apparatus connected to the host equipment.

Figure 8:
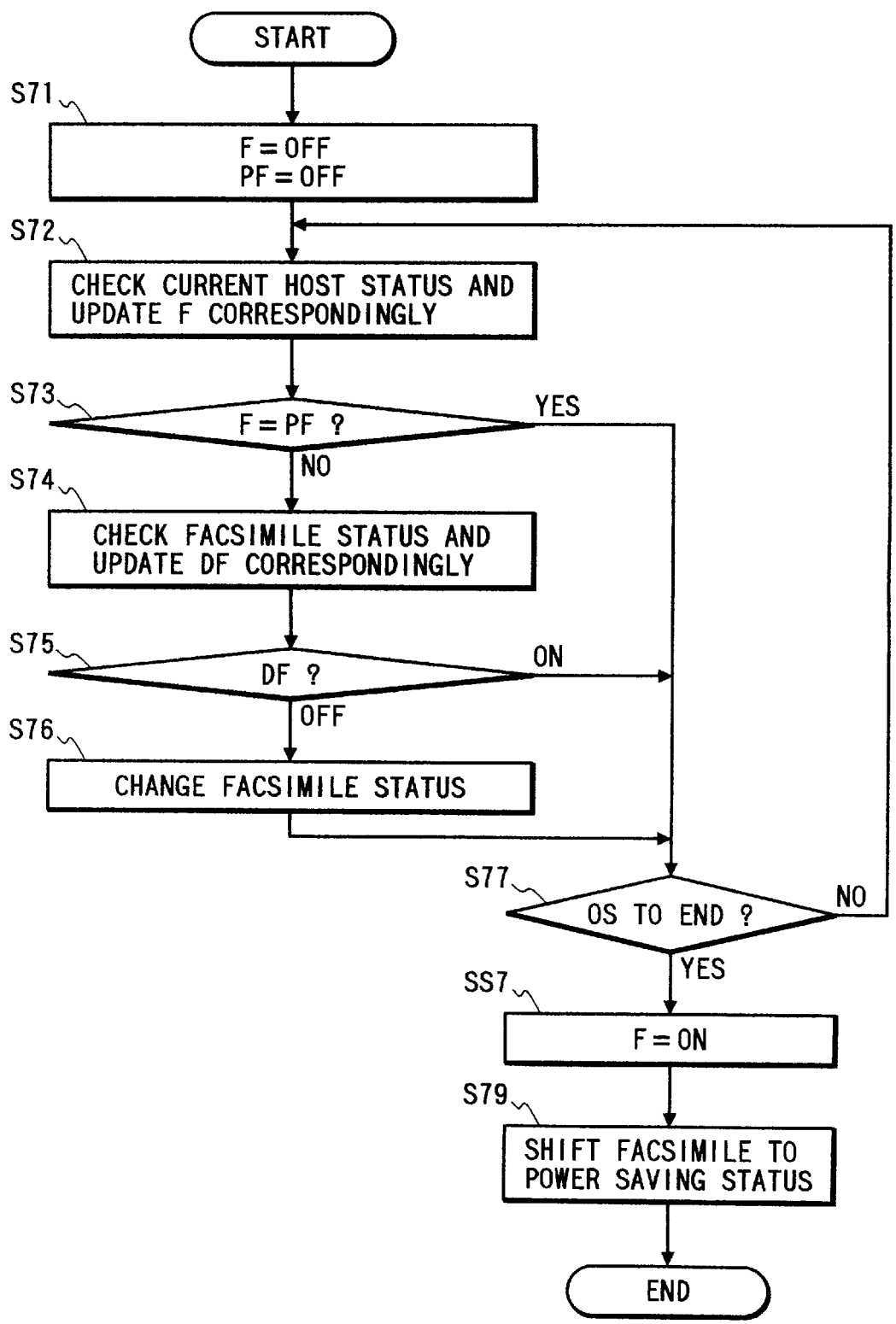
FIG. 8 is a flow chart showing the entire control sequence of a shift to the power saving status.

FIG. 8 is a flow chart showing a control sequence for shifting to the power saving status in the second embodiment.

At first a flag F for identifying the current status of the host equipment and a flag PF for identifying the preceding status of the host equipment are turned off (step S71). Each flag is off in the power saving status and on in the active status.

Then a host status detecting function is activated to investigate the current status of the host equipment, thereby determining the status of thereof, and the flag F is varied according to the determined status (step S72). The host status detecting function is same as already explained in relation to FIG. 4.

Then the flag F is compared with the flag PF to discriminate if the status of the host equipment has been shifted (step S73).

In case of a shift in the status of the host equipment, a device status detecting function is activated to investigate the status of the facsimile apparatus connected to the host equipment (step S74). The device status detecting function varies a flag DF, for discriminating the status of the facsimile apparatus, according to the status of the facsimile apparatus. The flag DF indicates, in the ON state, the power saving status of the facsimile apparatus, and the active status thereof in the OFF state. The device status detecting function is same as already explained in relation to FIG. 5 (step S75).

Then the status of the facsimile apparatus is checked by the flag DF (step S75). If it is in the active state, there is activated a status shift informing function (step S76). If the facsimile apparatus is in the course of execution of any process, the facsimile apparatus disregards the status shift informing command and continues the process in progress. The status shift informing function is realized as explained in the foregoing in relation to FIG. 6.

Then there is checked whether the OS is to be terminated (step S77). Also there is similarly checked whether the OS is to be terminated in case the step S73 identifies that the status of the host equipment has not shifted, or in case the step S75 identifies that the facsimile apparatus is in the power saving status.

If the OS is to be terminated, in preparation for the turning-off of the power supply in the host equipment, the flag F is turned on to activate the status shift informing function thereby shifting the facsimile apparatus to the power saving status prior to the termination of the OS (step S79).

In case the step S77 identifies that the OS is not to be terminated, the above-explained sequence is repeated, at a predetermined interval, from the step S72 of activating the host status detecting function.

In this manner the status of the host equipment can be synchronized with that of the facsimile apparatus when required, thereby minimizing the electric power consumption.

In the foregoing embodiments a facsimile apparatus has been explained as the peripheral equipment, but these embodiments can be naturally be applied likewise to a printer, a scanner, a copying machine or a facsimile apparatus connected to the parallel interface, or a printer, a scanner, a copying machine or a facsimile apparatus connected to the serial interface, or a CD-ROM connected to the SCSI interface.

Also in the foregoing embodiments, the power saving status function is achieved by the execution of a program stored in the hard disk 8 by the CPU 1, but such program may also be stored in a ROM, a RAM or a floppy disk and the function may be realized by a hardware.

Also in order to realize the above-mentioned function with a program, program codes including a host status detecting module, a device status detecting module and a status shift informing module can be stored in memory means (a hard disk, a floppy disk etc.).

The host status detecting module is to detect the power saving status or the active status of the host equipment as explained in FIG. 4. The device status detecting module is to detect the power saving status or the active status of the peripheral equipment as explained in FIG. 5. The status shift informing module is to inform the peripheral equipment of the shift of the host equipment to the power saving status or the return of the host equipment to the active status as explained in FIG. 6.

As explained in the foregoing, the present invention allows to shift the status of the peripheral equipment according to the status of the host equipment, without providing the peripheral equipment with a timer function or the like for measuring the time of shifting to the power saving status.

What is claimed is:

1. An information processing apparatus having a host equipment with a first operation mode and a second operation mode and a peripheral equipment with a third operation mode and a fourth operation mode, said apparatus comprising:

host status detecting means for detecting whether said host equipment is in the first operation mode or in the second operation mode;

peripheral status detecting means for detecting whether said peripheral equipment is in the third operation mode or in the fourth operation mode;

change instructing means for instructing a mode change from the third operation mode to the fourth operation mode to said peripheral equipment, in case the operation mode of the host equipment detected by said host status detecting means is the first operation mode and the operation mode of the peripheral equipment detected by said peripheral status detecting means is the third operation mode; and mode changing means for changing the operation mode of said peripheral equipment from the third operation mode to the fourth operation mode in response to the instruction of said change instructing means.

2. An information processing apparatus according to claim 1, wherein the first operation mode is a power saving status mode of the host equipment, the second operation mode is an active status mode thereof, the third operation mode is an active status mode of the peripheral equipment, and the fourth operation mode is a power saving status mode thereof.

3. An information processing apparatus according to claim 1, further comprising:

activation instructing means for instructing a mode shift to the third operation mode in case said peripheral equipment is in the fourth operation mode;

wherein, in case a mode shift is instructed by said change instructing means in the course of execution of a process based on the instruction of said activation instructing means, said instruction for the mode shift is disregarded.

4. An information processing apparatus having a host equipment with a first operation mode and a second operation mode and a peripheral equipment with a third operation mode and a fourth operation mode, said apparatus comprising:

host status detecting means for detecting a change in said host equipment from the second operation mode to the first operation mode;

peripheral status detecting means for detecting whether said peripheral equipment is in the third operation mode or in the fourth operation mode;

changing instructing means for instructing a mode change from the third operation mode to the fourth operation mode to said peripheral equipment, in case the change in the operation mode is detected by said host status detecting means and the operation mode of the peripheral equipment detected by said peripheral status detecting means is the third operation mode; and mode changing means for changing the operation mode of said peripheral equipment from the third operation mode to the fourth operation mode in response to the instruction of said change instructing means.

5. An information processing apparatus according to claim 4, wherein the first operation mode is a power saving status mode of the host equipment, the second operation mode is an active status mode thereof, the third operation mode is an active status mode of the peripheral equipment, and the fourth operation mode is a power saving status mode thereof.

6. An information processing apparatus according to claim 4, further comprising:

activation instructing means for instructing a mode shift to the third operation mode in case said peripheral equipment is in the fourth operation mode;

wherein, in case a mode shift is instructed by said change instructing means in the course of execution of a process based on the instruction of said activation instructing means, said instruction for the mode shift is disregarded.

7. An information processing apparatus having a host equipment connected to a peripheral equipment with a first operation mode and a second operation mode, said apparatus comprising:

operation mode selecting means for determining whether said information processing apparatus is to be operated in a third operation mode or a fourth operation mode;

host status detecting means for detecting whether said host equipment is currently in the third operation mode or in the fourth operation mode;

peripheral status detecting means for detecting whether said peripheral equipment is in the first operation mode or in the second operation mode; and change instructing means for instructing a mode change from the first operation mode to the second operation mode to said peripheral equipment, in case the operation mode of the host equipment detected by said host status detecting means is the third operation mode and the operation mode of the peripheral equipment detected by said peripheral status detecting means is the first operation mode.

8. An information processing apparatus according to claim 7, wherein the first operation mode is an active status mode of the peripheral equipment, the second operation mode is a power saving status mode thereof, the third operation mode is a power saving status mode of the information processing apparatus, and the fourth operation mode is an active status mode thereof.

9. An information processing apparatus connected to a peripheral equipment with a first operation mode and a second operation mode, said apparatus comprising:

operation mode selecting means for determining whether said information processing apparatus is to be operated in a third operation mode or a fourth operation mode;

host status detecting means for detecting a mode shift from the third operation mode to the fourth operation mode;

peripheral status detecting means for detecting whether said peripheral equipment is in the first operation mode or in the second operation mode; and change instructing means for instructing a mode change from the first operation mode to the second operation mode to said peripheral equipment, in case the change of the operation mode is detected by said host status detecting means and the operation mode of the peripheral equipment detected by said peripheral status detecting means is the first operation mode.

10. An information processing apparatus according to claim 9, wherein the first operation mode is an active status mode of the peripheral equipment, the second operation mode is a power saving status mode thereof, the third operation mode is an active status mode of the information processing apparatus, and the fourth operation mode is a power saving status mode thereof.

11. A status managing method for an information processing apparatus having a host equipment with a first operation mode and a second operation mode and a peripheral equipment with a third operation mode and a fourth operation mode, said method comprising:

a host status detecting step of detecting whether said host equipment is in the first operation mode or in the second operation mode;

a peripheral status detecting step of detecting whether said peripheral equipment is in the third operation mode or in the fourth operation mode;

a change instructing step of instructing a mode change from the third operation mode to the fourth operation mode to said peripheral equipment, in case the operation mode of the host equipment detected by said host status detecting step is the first operation mode and the operation mode of the peripheral equipment detected by said peripheral status detecting step is the third operation mode; and a mode changing step of changing the operation mode of said peripheral equipment from the third operation mode to the fourth operation mode in response to the instruction of said change instructing step.

12. A status managing method according to claim 11, wherein the first operation mode is a power saving status mode of the host equipment, the second operation mode is an active status mode thereof, the third operation mode is an active status mode of the peripheral equipment, and the fourth operation mode is a power saving status mode thereof.

13. A status managing method according to claim 11, further comprising:

an activation instructing step of instructing a mode shift to the third operation mode in case said peripheral equipment is in the fourth operation mode;

wherein, in case a mode shift is instructed by said change instructing step in the course of execution of a process based on the instruction of said activation instructing step, said instruction for the mode shift is disregarded.

14. A status managing method for an information processing apparatus having a host equipment with a first operation mode and a second operation mode and a peripheral equipment with a third operation mode and a fourth operation mode, said method comprising:

a host status detecting step of detecting a change in said host equipment from the second operation mode to the first operation mode;

a peripheral status detecting step of detecting whether said peripheral equipment is in the third operation mode or in the fourth operation mode;

a change instructing step of instructing a mode change from the third operation mode to the fourth operation mode to said peripheral equipment, in case the change in the operation mode is detected by said host status detecting step and the operation mode of the peripheral equipment detected by said peripheral status detecting step is the third operation mode; and a mode changing step of changing the operation mode of said peripheral equipment from the third operation mode to the fourth operation mode in response to the instruction of said change instructing step.

15. A status managing method according to claim 14, wherein the first operation mode is a power saving status mode of the host equipment, the second operation mode is an active status mode thereof, the third operation mode is an active status mode of the peripheral equipment, and the fourth operation mode is a power saving status mode thereof.

16. A status managing method according to claim 14, further comprising:

an activation instructing step of instructing a mode shift to the third operation mode in case said peripheral equipment is in the fourth operation mode;

wherein in case a mode shift is instructed by said change instructing step in the course of execution of a process based on the instruction of said activation instructing step, said instruction for the mode shift is disregarded.

17. A memory medium storing a control program for controlling an information processing apparatus having a host equipment connected to a peripheral equipment with a first operation mode and a second operation mode and adapted to operate in a third operation mode or a fourth operation mode, said program comprising:

a host status detecting module for detecting whether said host equipment is currently in the third operation mode or in the fourth operation mode;

a peripheral status detecting module for detecting whether said peripheral equipment is in the first operation mode or in the second operation mode; and a change instructing module for instructing a mode change from the first operation mode to the second operation mode to said peripheral equipment, in case the operation mode of the host equipment detected by said host status detecting module is the third operation mode and the operation mode of the peripheral equipment detected by said peripheral status detecting module is the first operation mode.

18. A memory medium according to claim 17, wherein the first operation mode is an active status mode of the peripheral equipment, the second operation mode is a power saving status mode thereof, the third operation mode is a power saving status mode of the information processing apparatus, and the fourth operation mode is an active status mode thereof.

19. A memory medium storing a control program for controlling an information processing apparatus connected to a peripheral equipment with a first operation mode and a second operation mode and adapted to operate in a third operation mode or a fourth operation mode, said program comprising:

a host status detecting module for detecting a mode shift from the third operation mode to the fourth operation mode;

a peripheral status detecting module for detecting whether said peripheral equipment is in the first operation mode or in the second operation mode; and a change instructing module for instructing a mode change from the first operation mode to the second operation mode to said peripheral equipment, in case the change of the operation mode is detected by said host status detecting module and the operation mode of the peripheral equipment detected by said peripheral status detecting module is the first operation mode.

20. A memory medium according to claim 19, wherein the first operation mode is an active status mode of the peripheral equipment, the second operation mode is a power saving status mode thereof, the third operation mode is an active status mode of the information processing apparatus, and the fourth operation mode is a power saving status mode thereof.

* * * * *

UNITED STATES PATENT AND TRADEMARK OFFICE
CERTIFICATE OF CORRECTION

PATENT NO. : 5,974,559

DATED : October 26, 1999

INVENTOR(S) : NOBUYUKI BANNAI

It is certified that error appears in the above-identified patent and that said Letters Patent is hereby corrected as shown below:

COLUMN 1

Line 17, "has" should read --has been--.

COLUMN 7

Line 42, "the" (second occurrence) should be deleted.

COLUMN 9

Line 15, "be" (second occurrence) should be deleted.

Signed and Sealed this

Eighth Day of August, 2000

Attest:

Q. TODD DICKINSON

Attesting Officer

Director of Patents and Trademarks